Figure 1:
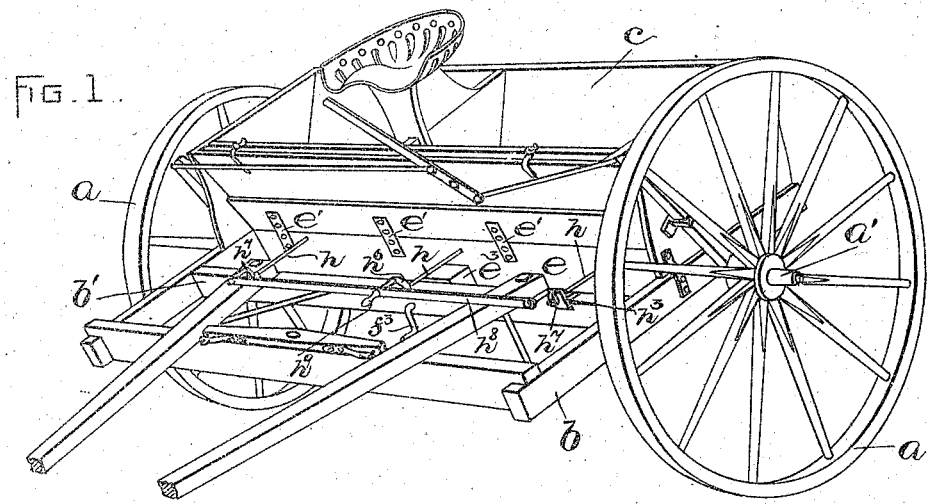
Figure 2:
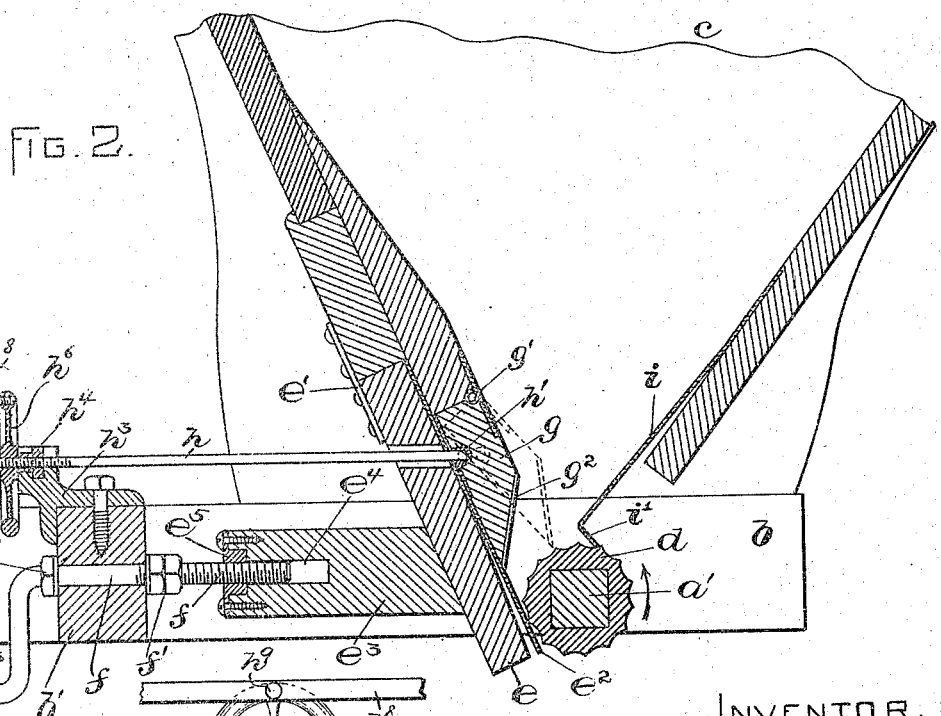
Figure 3:
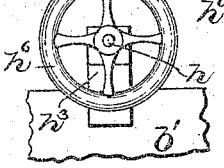

(No Model.)

E. THOMAS.
FERTILIZER DISTRIBUTER.

No. 533,252.  Patented Jan. 29, 1895.

WITNESSES:
A. D. Harrison
J. P. Davis

INVENTOR,
E. Thomas
by Wright Brown & Quinby
Attys.

(No Model.)
F. TRAUB.
WASHING MACHINE.
No. 533,253.   Patented Jan. 29, 1895.
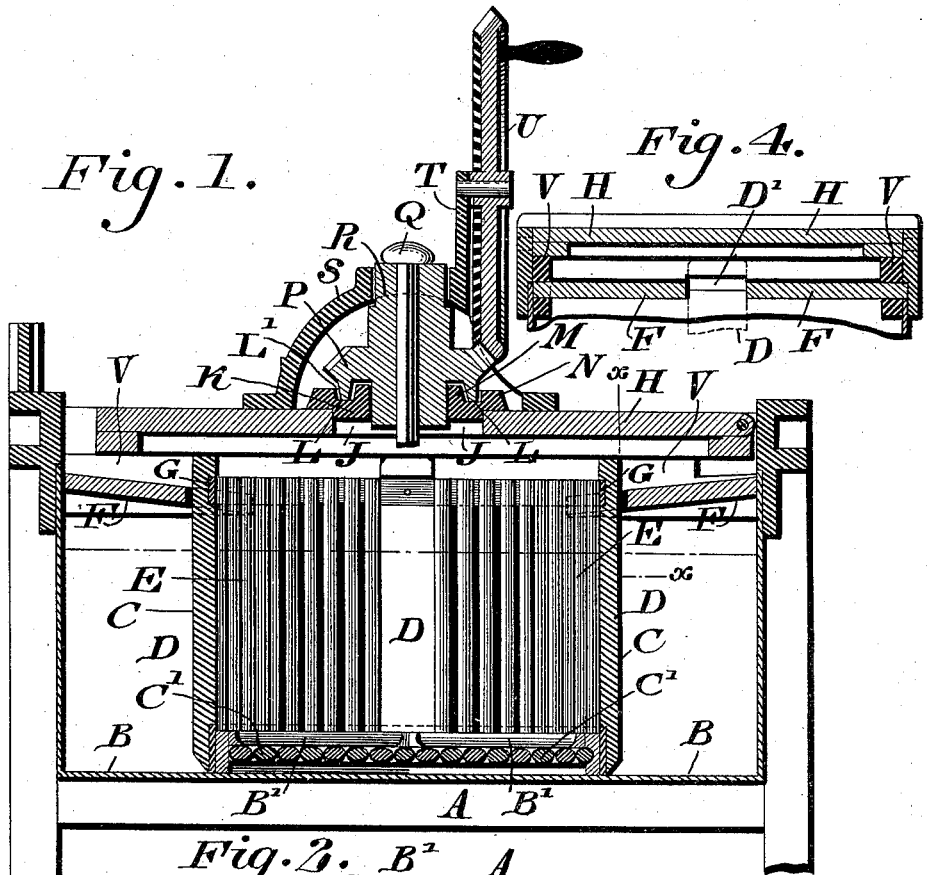
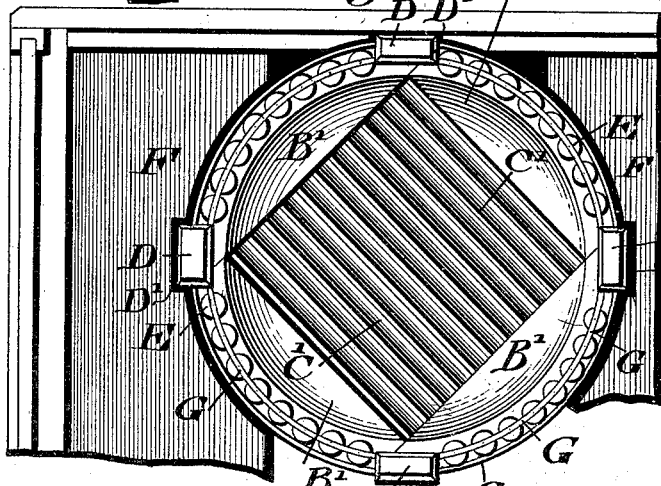
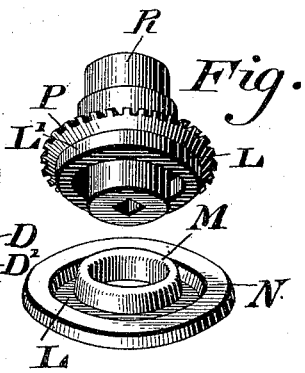
INVENTOR
Frederick Traub
BY
ATTORNEY.